3,135,803
METHOD OF PREPARING ALKYLATED
BORON HYDRIDES
Allen F. Graefe, Pomona, Calif., assignor to Aerojet-General Corporation, Azusa, Calif., a corporation of Ohio
No Drawing. Filed Mar. 7, 1960, Ser. No. 13,381
9 Claims. (Cl. 260—606.5)

This invention relates to a convenient and economical method for the conversion of boron hydrides to their alkyl derivatives. In particular, the invention relates to such a method for the conversion of pentaborane-9 to its alkyl derivatives.

The alkylated boron hydrides prepared by the method of this invention are useful as high energy fuels for aircraft and missiles, being particularly valuable for use in conventional liquid bipropellant rockets. When used for this purpose the alkylated boron hydrides are burned with an oxidizer such as fuming nitric acid in a liquid combustion chamber. The gases thus produced are expelled through an exhaust nozzle and thrust is thereby imparted to the combustion chamber resulting in forward motion of the rocket. Alkylated boron hydrides can be utilized in this fashion for rocket propulsion purposes by employing them as the fuel in the method taught in assignee's U.S. Patent 2,771,739.

The essence of this invention resides in my discovery that a boron hydride reacts with an alkyl halide in the presence of a critical quantity of a Friedel-Crafts catalyst to yield the corresponding alkylated hydride. Thus, when quantities of catalyst within a fairly narrow range are used the product yields approach 100 percent of theoretical recovery; whereas, when quantities outside of this range are used the product yield is excessively low and substantial quantities of undesirable by-products are formed. The method of this invention is illustrated by the following reaction scheme showing the reaction between pentaborane-9 and isopropyl chloride in the presence of aluminum chloride as a catalyst:

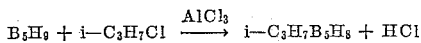

$$B_5H_9 + i\text{-}C_3H_7Cl \xrightarrow{AlCl_3} i\text{-}C_3H_7B_5H_8 + HCl$$

The boron hydrides operative as reactants in the method of this invention are those boron hydrides which are liquid or solid and stable at room temperature. Thus, diborane, which is a gas at room temperature, is an unsuitable starting material for my reaction. Likewise, tetraborane and pentaborane-11 ($B_5H_{11}$) are unsuitable reactants since both are unstable at room temperature. Examples of boron hydrides other than pentaborane-9 which are liquid or solid and stable at room temperature and hence operative in the method of my invention are hexaborane, decaborane, and higher hydrides such as $B_{12}H_{12}$.

Any alkyl halide such as methyl bromide, ethyl iodide, hexyl fluoride, butyl chloride, etc., is suitable as a starting material in my novel method. It will be observed that the method of this invention results in the formation of only one by-product, this being a halogen acid. The halogen acid represents only a small weight percent of the total output of the system and it is easily recoverable. The recovered acid can be used for the formation of additional alkyl halide reactant, if desired. My reaction is an extremely simple and easily controllable one which can be carried out at room temperature and which normally goes to completion within about one minute's time as will be demonstrated in examples to follow. For these reasons the method of this invention is greatly superior to any other known process for the preparation of alkyl derivatives of boron hydride.

Any material suitable as a Friedel-Crafts catalyst is also suitable as a catalyst for use in my novel method. The class of Friedel-Crafts catalysts is well-known and includes among its members: aluminum chloride, aluminum bromide, zinc chloride, zirconium tetrachloride, ferric chloride, stannic chloride, ferric bromide, etc. For reasons of economy and its ready availability, aluminum chloride is my preferred catalyst.

For best results I have found that there should be an excess of the boron hydride reactant over the alkyl halide, the preferred ratio of hydride to halide being about 3 to 1 (molar basis). However, there is nothing critical about the hydride/halide ratio and any ratio can be used within the scope of this invention.

It should be pointed out that where pentaborane-9 is employed as the boron hydride reactant, the monoalkyl derivative is obtained as a product and this is true regardless of what ratio of reactants is used. However, it is possible in some cases where other boron hydrides are employed to obtain products having more than one alkyl substituent group. For example, where decaborane is the boron hydride reactant it is possible to obtain alkyl derivatives thereof having as many as four alkyl substituents. All alkylated boron hydride products of this invention have utility as high energy fuels. In general, it has been observed that where decaborane is alkylated according to the method taught herein, the greater the ratio of alkyl halide to decaborane the greater is the tendency to obtain polyalkyl derivatives and also the tendency to obtain products having more alkyl substituents.

We have discovered the operative quantities of Friedel-Crafts catalysts for purposes of this invention to be those not greater than about 2.5 moles of catalyst per 100 moles of total reactant (both alkyl halide and boron hydride) input. Quantities above this range result in conglomerate mixtures containing inordinately low percentages of product which are difficult or economically impossible to recover in relatively pure form. The optimum range of catalyst quantities has been found to be that from about 0.15 to about 0.5 mole of catalyst per 100 moles of reactant input.

Reaction temperature is not a critical variable in the novel method of my invention, the only significant effect of an increase or decrease in temperature being a corresponding increase or decrease in reaction rate. Since temperature is not critical in my method I prefer, for obvious reasons of economy, to conduct the reaction at room temperature or thereabouts.

The reaction of this invention is preferably conducted in an inert organic solvent. Any organic solvent known to those skilled in the art such as chloroform, carbon tetrachloride, methylene chloride, ethylene dichloride, etc., is suitable as a reaction medium for purposes of this invention. Likewise, an excess of one of the reactants such as, for example, an excess of pentaborane-9 will serve as a medium for my reaction.

The Friedel-Crafts catalysts of this invention are hygroscopic by nature and care must be exercised to prevent, insofar as possible, contamination of the catalysts with moisture to prevent destruction of their catalytic properties or of the catalysts themselves. This is of especial importance in view of the small quantities of catalytic materials involved in the practice of my invention since such small quantities are normally decomposed by moisture merely by exposure to the air for an appreciable length of time.

To contribute to a better understanding of this invention, the following examples are presented. It should be understood, however, that these examples are presented merely as a means of illustration and that the invention is not limited to the particular embodiments and conditions described therein.

EXAMPLE I

*Preparation of Isopropylpentaborane Using a Larger Than Optimum Quantity of Catalyst*

0.143 gram (1.0171 millimoles) of aluminum chloride was weighed into a stainless steel bomb fitted with a pressure gage and a dragon valve. Following the weighing of the aluminum chloride into the bomb, 3.78 grams (60 millimoles) of pentaborane-9 and 1.57 grams (20 millimoles) of isopropyl chloride were loaded from a high vacuum measuring system through the valve into the bomb, which was maintained at −196° C. The bomb was then mounted in a wrist-action shaker and then warmed rapidly to 25° C. in a constant temperature bath maintained at that temperature. Within one minute the pressure reached 70 p.s.i. gage at which time the reaction was complete.

The reaction products were fractionated under high vacuum through a series of cold traps, and identified by vapor pressure and/or infrared spectograms. The following reaction products were isolated: $H_2$, $B_5H_9$, HCl, $C_3H_8$, $B_2H_6$, $B_2H_5Cl$, $BHCl_2$, $BCl_3$, and isopropylpentaborane. The isopropylpentaborane was identified by its infrared spectrum and its heat of combustion and was found to exhibit the following properties: $d^{23°}$ 0.71 g./ml.; F.P. −45° C.; estimated boiling point, about 135° C.; $H_c$=25,300 B.t.u./lb. The compound was slowly hydrolyzed by water.

EXAMPLE II

*Preparation of Isopropylpentaborane Using an Optimum Quantity of Catalyst*

0.0358 gram (0.271 millimole) of aluminum chloride was weighed into a stainless steel bomb fitted with a pressure gage and a dragon valve. Following the weighing of the aluminum chloride into the bomb, 3.78 grams (60 millimoles) of pentaborane-9 and 1.57 grams (20 millimoles) of isopropyl chloride were loaded from a high vacuum measuring system through the valve into the bomb, which was maintained at −196° C. The bomb was then mounted in a wrist-action shaker and then warmed rapidly to 25° C. in a constant temperature bath maintained at that temperature. Within one minute the pressure reached 70 p.s.i. gage at which time the reaction was complete.

The reaction products were fractionated under high vacuum through a series of cold traps, and identified by vapor pressure and/or infrared spectograms. The following reaction products were isolated: $H_2$, $B_5H_9$, HCl, $C_3H_8$, $B_2H_6$, and isopropylpentaborane. The isopropylpentaborane was identified by its infrared spectrum and its heat of combustion and was found to exhibit the following properties: $d^{23°}$ 0.71 g./ml.; F.P. −45° C.; estimated boiling point, about 135° C.; $H_c$=24,700 B.t.u./lb. The compound was slowly hydrolyzed by water.

EXAMPLE III

*Preparation of Isopropylpentaborane Using an Optimum Quantity of Catalyst*

0.0193 gram (0.145 millimole) of aluminum chloride was weighed into a stainless steel bomb fitted with a pressure gage and a dragon valve. Following the weighing of the aluminum chloride into the bomb, 3.78 grams (60 millimoles) of pentaborane-9 and 1.57 grams (20 millimoles) of isopropyl chloride were loaded from a high vacuum measuring system through the valve into the bomb, which was maintained at −196° C. The bomb was then mounted in a wrist-action shaker and then warmed rapidly to 25° C. in a constant temperature bath maintained at this temperature. Within one minute the pressure reached 70 p.s.i. gage at which time the reaction was complete.

The reaction products were fractionated under high vacuum through a series of cold traps, and identified by vapor pressure and/or infrared spectograms. The following reaction products were isolated: $H_2$, $B_5H_9$, $C_3H_8$, and isopropylpentaborane. The isopropylpentaborane was identified by its infrared spectrum and its heat of combustion. It was found to exhibit the following properties: $d^{23°}$ 0.71 g./ml.; F.P. −45° C.; estimated boiling point, about 135° C.; $H_c$=24,700±1000 B.t.u./lb. The compound was slowly hydrolyzed by water.

EXAMPLE IV

*Reaction of Stoichiometric Proportions of Pentaborane-9 and Isopropyl Chloride in the Presence of an Optimum Quantity of Catalyst*

0.0197 gram (0.148 millimole) of aluminum chloride was weighed into a stainless steel bomb fitted with a pressure gage and a dragon valve. Following the weighing of the aluminum chloride into the bomb, 1.24 grams (20 millimoles) of pentaborane-9 and 1.57 grams (20 millimoles) of isopropyl chloride were loaded from a high vacuum measuring system through the valve into the bomb, which was maintained at −196° C. The bomb was then mounted in a wrist-action shaker and then warmed rapidly to 25° C. in a constant temperature bath maintained at this temperature. Within one minute the pressure reached 70 p.s.i. gage at which time the reaction was complete.

The reaction products were fractionated under high vacuum through a series of cold traps, and identified by vapor pressure and/or infrared spectrograms. The following reaction products were isolated: $H_2$, $B_5H_9$, HCl, $C_3H_8$, and isopropylpentaborane. The isopropylpentaborane was identified by its infrared spectrum and its heat of combustion. It was found to exhibit the following properties: $d^{23°}$ 0.71 g./ml.; F.P. −45° C.; estimated boiling point, about 135° C.; $H_c$=24,700±1000 B.t.u./lb. The compound was slowly hydrolyzed by water.

To aid in a better understanding of the results of Examples I through IV, significant data derived from these results is given below in Table I.

TABLE I

| Example | Mole Ratio ($B_5/C_3$) | Moles $AlCl_3$ per 100 Moles of Reactants | Yield of Isopropylpentaborane (Percent of Theoretical) |
|---|---|---|---|
| I | 3 to 1 | 1.34 | 55.6 |
| II | 3 to 1 | 0.34 | 97.9 |
| III | 3 to 1 | 0.18 | 94.76 |
| IV | 1 to 1 | 0.37 | 81.8 |

Table I graphically illustrates the consequences of employing amounts of catalysts outside of the operative range of this invention; the operative range comprising, as explained above, those quantities not greater than about 2.5 moles of catalyst per 100 moles of reactant input. Turning to Table I it will be noted that in Examples II, III, and IV quantities of aluminum chloride within the optimum range from about 0.15 to about 0.5 mole of catalyst per 100 moles of reactant input were used and the yield of isopropylpentaborane was very high. In Example I an amount of aluminum chloride above the optimum range was employed with the result that the product yield was lower than in the other examples and commingled with a greater variety of by-products. A comparison of Examples III and IV illustrates the advantage of a 3 to 1 ratio of pentaborane-9 to isopropyl chloride over a 1 to 1 ratio of these reactants since the yield in Example III is higher than that in Example IV even though a higher ratio of catalyst to reactants was employed in the latter.

It will be apparent that any alkylated boron hydride can be prepared according to the method of this invention by simply reacting the corresponding boron hydride with the corresponding alkyl halide in the presence of a Friedel-Crafts catalyst in an amount within the operative range as taught herein. For example, methyl bromide and ethyl fluoride react with decaborane in the presence of aluminum bromide in a catalytic amount to yield methyldecaborane and ethyldecaborane, respectively. It is, of course, within the scope of my invention to employ mixtures of reactants as well as mixtures of catalysts in my novel method.

I claim:
1. The method of preparing alkylated boron hydrides comprising reacting a boron hydride selected from the group consisting of boron hydrides which are liquid and stable at room temperature and boron hydrides which are solid and stable at room temperature with an alkyl halide, in the presence of a Friedel-Crafts catalyst present in an amount corresponding to a ratio between about 0.15 and about 0.5 mole of catalyst to 100 moles of total reactant input, employing a mole ratio of input boron hydride to input alkyl halide of from about 1 to 1 to about 3 to 1.

2. The method of claim 1 in which the reaction between the boron hydride and the alkyl halide is conducted at room temperature.

3. The method of preparing isopropylpentaborane which comprises reacting pentaborane-9 with isopropyl chloride at room temperature and in the presence of from about 0.15 to about 0.5 mole of aluminum chloride per 100 moles of total reactant input, employing a mole ratio of input pentaborane-9 to input isopropyl chloride of about 3 to 1 and utilizing the excess pentaborane-9 as the reaction medium.

4. The method of claim 1 in which the reaction is carried out in an inert organic solvent.

5. The method of claim 1 in which one of the reactants is present in excess and serves as a medium for the reaction.

6. A method of preparing isopropylpentaborane which comprises reacting pentaborane-9 and isopropyl chloride, in the presence of a quantity of aluminum chloride catalyst not greater than that corresponding to a ratio between about 0.15 and 0.5 mole of catalyst to 100 moles of total reactant input, employing a mole ratio of input pentaborane-9 to input isopropyl chloride of about 1 to 1 to about 3 to 1.

7. The method of preparing methyldecaborane which comprises reacting decaborane with methyl bromide in the presence of a quantity of aluminum bromide catalyst not greater than that corresponding to a ratio between about 0.15 and 0.5 mole of catalyst to 100 moles of total reactant input, employing a mole ratio of input decaborane to input methyl bromide of about 1 to 1 to about 3 to 1.

8. The method of preparing ethyldecaborane which comprises reacting decaborane with ethyl fluoride in the presence of a quantity of aluminum bromide catalyst not greater than that corresponding to a ratio between about 0.15 and 0.5 mole of catalyst to 100 moles of total reactant input, employing a mole ratio of input decaborane to input ethyl fluoride of about 1 to 1 to about 3 to 1.

9. The method of preparing alkylated boron hydrides which comprises reacting a boron hydride selected from the group consisting of boron hydrides which are liquid and stable at room temperature and boron hydrides which are solid and stable at room temperature with an alkyl halide, in the presence of a quantity of Friedel-Crafts catalyst selected from the group consisting of aluminum chloride, aluminum bromide, zinc chloride, zirconium tetrachloride, ferric chloride, stannic chloride, ferric bromide, and mixtures thereof not greater than that corresponding to a ratio between about 0.15 and 0.5 mole of catalyst to 100 moles of total reactant input, employing a mole ratio of input boron hydride to input alkyl halide of from about 1 to 1 to about 3 to 1.

References Cited in the file of this patent
UNITED STATES PATENTS

| | | |
|---|---|---|
| 2,685,575 | Heiligmann et al. | Aug. 3, 1954 |
| 2,987,554 | Levy et al. | June 6, 1961 |
| 3,038,012 | Altwicker et al. | June 5, 1962 |
| 3,045,049 | Clark et al. | July 17, 1962 |
| 3,052,725 | Altwicker et al. | Sept. 4, 1962 |

OTHER REFERENCES

Stock: Hydrides of Boron and Silicon, Cornell University Press, Ithaca, New York, 1933, pages 80–81.